Oct. 25, 1949.　　　　W. POOL　　　　2,485,772
APPARATUS FOR THE PREPARATION
OF ARTIFICIAL MATERIALS

Filed Dec. 17, 1946　　　　　　　　　　2 Sheets-Sheet 1

Inventor
W. POOL

Oct. 25, 1949.  W. POOL  2,485,772
APPARATUS FOR THE PREPARATION
OF ARTIFICIAL MATERIALS
Filed Dec. 17, 1946  2 Sheets-Sheet 2

Inventor
W. POOL
By
Attorneys

Patented Oct. 25, 1949

2,485,772

UNITED STATES PATENT OFFICE 2,485,772

APPARATUS FOR THE PREPARATION OF ARTIFICIAL MATERIALS

William Pool, Spondon, near Derby, England, assignor to Celanese Corporation of America, a corporation of Delaware Application December 17, 1946, Serial No. 716,843
In Great Britain January 4, 1946

4 Claims. (Cl. 18—30)

This invention relates to apparatus for the preparation of artificial materials, and in particular to the preparation of a fusible, highly polymerised filament-forming materials in a solid form suitable for use in the subsequent production of shaped products from such materials, e. g. in the melt-spinning of such materials to form artificial filaments and like products.

In the manufacture of shaped products from such materials it is convenient to have the materials in small solid pieces, either as irregular chips of more or less uniform weight or as regular pieces substantially uniform in both weight and shape. Various methods have been employed for bringing the materials to this state. Thus the pieces may be cut or broken from solid masses, or cast in moulds of the requisite form. One method of casting the materials makes use of the molten state of the materials at the end of the polymerisation thereof, by casting the materials within the vessel in which polymerisation has taken place. This may be done by lowering a perforated moulding block into the molten mass of material and allowing the whole to cool down, after which the rods formed in the perforations of the block are driven out and trimmed to length. This method, and others which have been employed for the purpose are somewhat slow and wasteful and the products thereof are not always wholly satisfactory as raw materials for the manufacture of formed products.

It has been found that a very advantageous way of forming fusible, filament-forming polymers into solid pieces of uniform size and shape is for the polymerised materials while still in a molten state at the completion of their polymerisation, to be forced under pressure, preferably directly from the vessel in which polymerisation has taken place, into moulds, in which the material is subsequently cooled and solidified. The materials are preferably subjected to a filtering operation as they leave the polymerisation vessel. By the above procedure, the moulds in which the material is cast can be completely filled, without waste and without the formation of faults and voids in the formed pieces, so that the pieces are of reliable uniformity as to their shape and weight. Moreover the method is both rapid and easy of execution.

An apparatus for carrying out the method of preparation described above comprises a vessel for containing the still-molten polymer, conveniently the polymerisation vessel itself, an outlet valve leading from the bottom of the vessel, a perforated rotatable block having its axis fixed in relation to said vessel and adapted, in its rotation, to bring the perforations therein successively into register with said outlet valve, and means for applying fluid pressure within said vessel so as to fill said perforations in succession with molten polymer under pressure. The perforations in the block may be closed at their ends remote from the vessel by means of a stationary plate which holds the block against the bottom of the vessel, or against a second stationary plate fixed in relation to the vessel. Opposite the outlet valve the plate, or the rotatable block itself may contain a narrow passage for allowing gas to escape from each perforation as the material is forced into the perforation. The plate may have a cold spot in the neighbourhood of the gas-escape passage so that the material is solidified as soon as it reaches the plate and is prevented from itself escaping through the gas-escape passage. Immediately before each perforation comes into register with the valve a current of nitrogen or other inert gas may be passed through it so as to expel air which might have a detrimental effect upon the material in its molten state. Provision may also be made for driving out the rod of material after it has solidified in the perforation in the block. The perforated block and the plates between which it is mounted, together with the heated inlet tube and filter, and knockout means for removing the formed rods of material, may constitute a unit capable of application at will to any one of a battery of polymerisation vessels, each provided with an outlet valve and means for applying pressure within the vessel. Careful provision should be made in this case for the securing of the heated inlet tube of the unit to the valve outlet of the vessel in such a way as to prevent separation under the moulding pressure employed.

By way of example one form of pressure moulding unit suitable for the purposes of the invention will now be described in greater detail with reference to the accompanying drawings in which.

Figure 1:
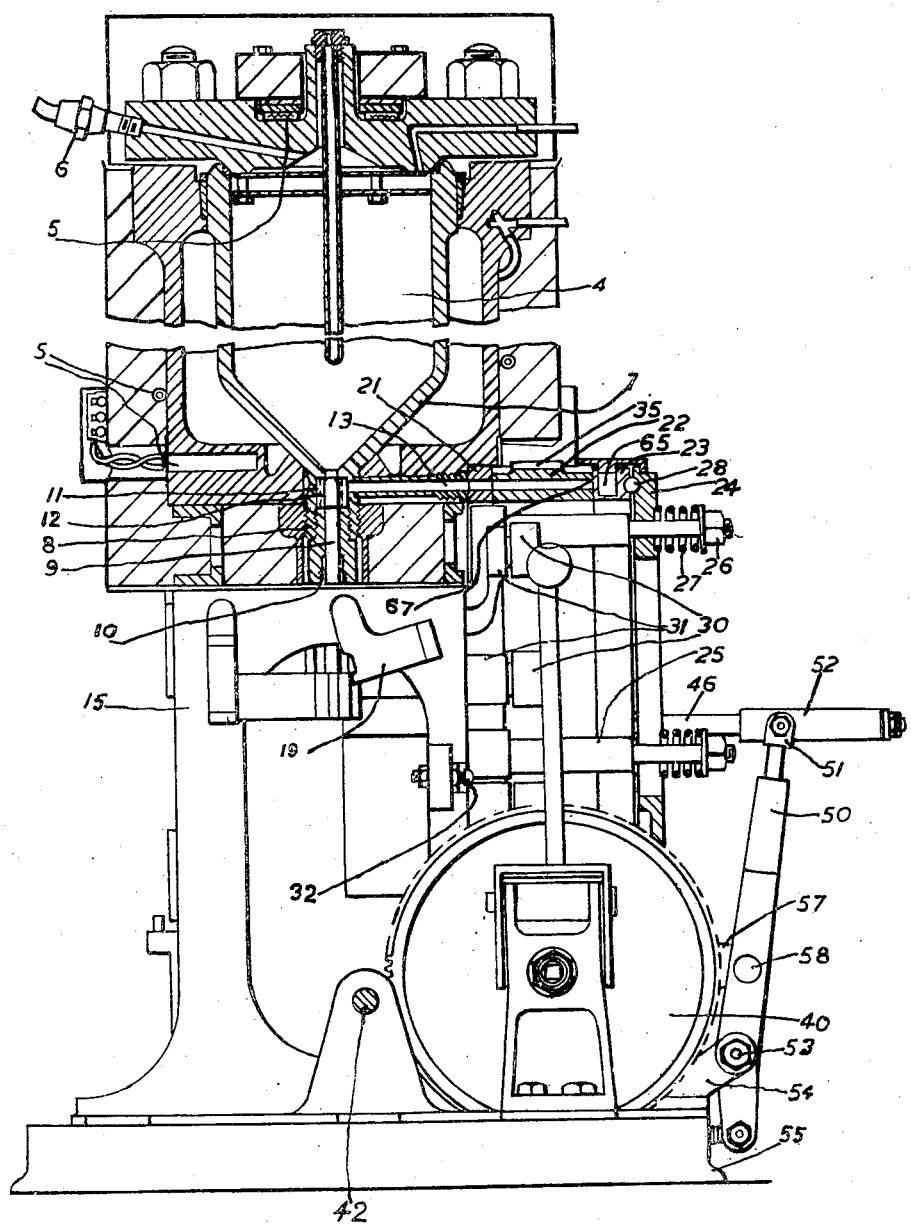
Fig. 1 is a side elevation, partly in section, of the apparatus as a whole.

The apparatus which is designed for the forming of rods of polymer of about ⅜" diameter and 2¾" long, weighing about 4 grams, comprises a polymerisation vessel or autoclave 4 in which the material is polymerised. The vessel 4 is provided with heating means 5 and with an inlet pipe 6 for applying within the vessel a pressure of inert gas (e. g. nitrogen or hydrogen) of the order of 15–20 atmospheres. The vessel has a conical bottom 7 terminating in an outlet 8 in which is provided an outlet valve member 9 entering the vessel through a gland 10. The valve member 9 permits or prevents the entry of material from the vessel 4 into a cylindrical space 11 in which, surrounding the valve member 9, is a cylindrical filter member 12. Leading away from the space 11 is a horizontal passage 13. The vessel 4 is firmly clamped to the top of a substantial frame 15 into the interior of which the valve member 9 protrudes downwards. A lever 16 pivoted to the frame at 17 is attached at one end 18 to the bottom of the valve member for the purpose of opening and closing the valve when necessary. A catch 19 is provided to hold the valve in the open position by engagement with the lever 16.

Clamped to the right-hand side of the frame 15 in Fig. 1 (i. e. to the near side in Fig. 2) are four rings 21, 22, 23, 24, which in Fig. 1 are shown half cut away so as to expose the internal arrangements. The clamping of the rings 21—24 is effected by three substantial studs 25 secured at their bases to the frame 15 and carrying nuts 26 at their outer ends by means of which heavy springs 27 are strongly compressed against recesses in the face of the outermost ring 24. The ring 24 engages the ring 23 through three hardened balls 28 located in part-spherical recesses in the adjacent faces of the rings 23, 24. The ring 23 engages directly with the face of the ring 22 which in turn engages directly with the face of the ring 21, the four engaging surfaces being carefully ground flat. The ring 22 is supported in a position co-axial with the remaining rings by three rollers 30 mounted on brackets 31 on the frame 15. The ring 21 is located with reference to the frame 15 at three points, by two hemispherical screw heads 32 and by the mouth of the horizontal passage 13, the face of the ring 21 being recessed for the engagement of these members and being carefully ground to make a pressure-tight engagement with the passage 13, at which point the ring 21 is bored through its thickness to provide a continuation of the passage 13.

Through the thickness of the ring 22 are bored forty-eight equally spaced passages 34 with their centres on the same radius from the axis of the four rings 21—24 as the passage 13 so that, as the ring 22 is rotated, each of the passages 34 is brought in turn into register with the passage 13. The ring 22 is driven by means of gear teeth 35 round its periphery engaging with a worm member 36 mounted on a shaft 37 and driven, through a clutch 38 operated by a clutch handle 39, from a large gear 40. The gear 40 is driven in turn by a small gear 41 mounted on a driving shaft 42.

The worm member 36 comprises an interrupted 4-start worm 43 occupying one half of its periphery, the other half being occupied by a semi-annular flange or tooth 44, the flange 44 acting as a worm of zero pitch. There are ninety-six gear teeth 35 round the ring 22, two for each passage 34, and in each revolution of the shaft 37 the ring 22 is held stationary for one half of the revolution by the flange 44 engaging with the teeth 35 and is rotated through a distance of two teeth during the other half revolution so as to bring into register with the passage 13 the passage 34 next to that which was previously in register.

Figure 2:
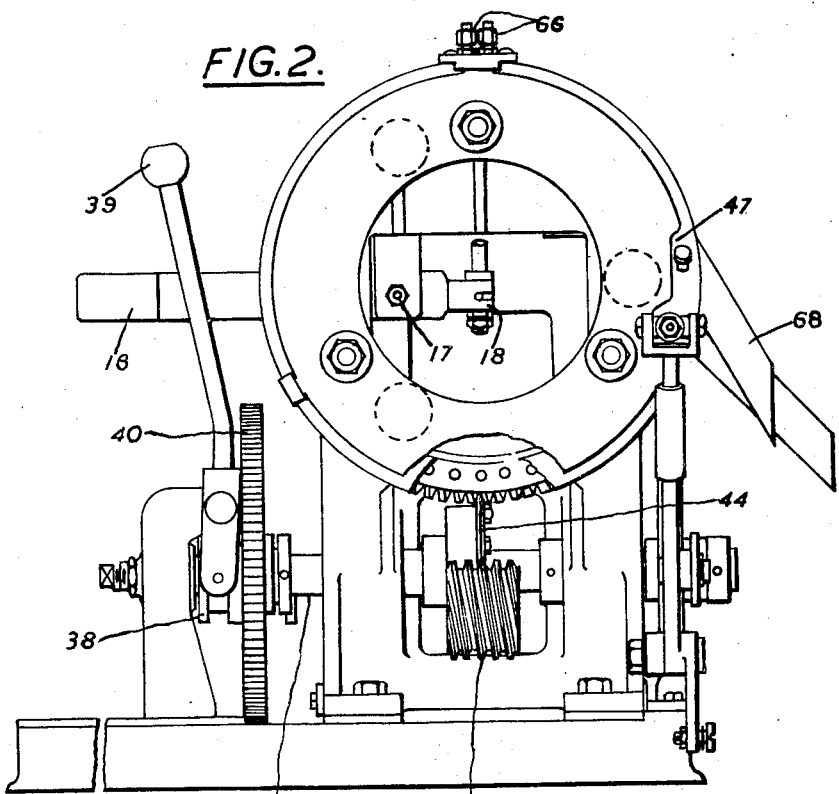
Fig. 2 is a front elevation of the lower part of the apparatus in which moulding is effected.
Figure 3:
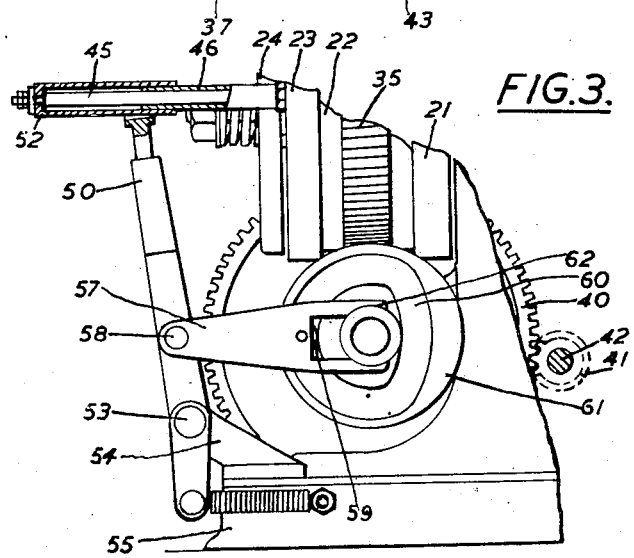
Fig. 3 is a view from the opposite side of a detail of Fig. 1.

The ring 22 rotates, as viewed in Fig. 2, in a counter-clockwise direction, and at a point nearly three-quarters of a revolution removed from the passage 13 there is disposed a plunger 45 working through a cylinder 46 secured to the ring 23, the ring 24 being cut away at 47 for this purpose and to accommodate a grease cup 48 for lubricating the contacting surfaces of the rings 22, 23. When the ring 22 is stationary the plunger 45 is in register with one of the passages 34 therein, and during this period is forced through that passage by means of a lever 50 forked at its upper end 51 for pivotal engagement with a cup 52 into the closed end of which the plunger 45 is secured, the cup 52 surrounding the tube 46. The lever 50 is pivoted at 53 to a bracket 54 mounted on the base plate 55 of the device and is secured by means of a link 57 (Fig. 3) pivoted at 58 to the lever 50 and carrying a cam-follower 59 engaging in a groove 60 in the face of a cam 61 mounted on the shaft 37. The end of the lever 57 opposite the point 58 is forked at 62 and embraces the shaft 37 so as to guide the link in its motion.

At a point 63 opposite the plunger 45 the ring 21 is bored so that the tip of the plunger can reach through it. Beyond the bore 63 is a chute 64 for the reception of sticks of moulded composition ejected through the bore. The ring 23 has in its thickness a recess 65 opposite the passage 13, to which recess cooling water is supplied through water connections 66. On the face of the ring 22 adjacent to the ring 23 each of the passages 34 communicates with a short, shallow groove 67 extending radially outwards to the edge of the face. The operation of the device is as follows:

After the completion of polymerisation in the vessel 4 the pressure of inert gas supplied through the connection 6 is raised, the outlet valve 9 in the bottom of the vessel is opened by means of the handle 16, and the clutch 38 is engaged by means of the handle 39 so as to connect the gear 40 to the shaft 37. Molten polymer leaving the vessel 4 under pressure by way of the outlet 8 passes through the filter 12 and then through the horizontal passage 13 into the bore 34 that is for the moment in register with the passage 13. Air or other gas already contained in the passage 34 escapes by way of the shallow groove 67 which constitutes a gas-escape passage. When the molten polymer reaches the end of the passage 34 however, the cold spot on the face of the ring 23 caused by the passage of cooling water through the recess 65 solidifies the polymer in the mouth of gas-escape passage 67 and prevents further escape of polymer. In this way the passage 34 is completely filled under the pressure obtaining in the vessel 4, with molten polymer. During the period above described the flange 44 has been in engagement with the gear teeth 35 so that the ring 22 has been held stationary. In due course, however, the half-worm 43 engages the teeth 35 and rotates the ring 22 through a distance of two teeth i. e. the interval between two adjacent passages 34. During the next half revolution of the shaft 37 the next passage 34 is filled, after which the ring 22 is again moved on, and so on. In due course the first of the passages 34 to be filled reaches the plunger 45. Up to this time the plunger, under the influence of the cam 61, has been passing idly in and out of passages 34 during the stationary periods of the ring 22. When the first filled passage 34 reaches the plunger 45 however, the material in the passage has had time to solidify completely and is forced out of the passage by the plunger in the form of a moulded stick of solid polymer. The stick of polymer on leaving the bore 63 in the ring 21 is received and conveyed away by the chute 64. In this way each stick of polymer is ejected in turn. The passage of the stick through the bore 63 cuts off any slight flash that may have formed on the ends, and particularly any fragments of material solidified in the groove 67. A second chute 68 is provided for the reception and guiding away of these fragments.

On the exhaustion of the polymerised material in the vessel 4 the valve 9 is closed by means of the handle 16 but the rotation of the ring 22 is continued until the last moulded stick of material is ejected by the plunger 45. The vessel may then be re-charged in situ and a fresh batch of material may be polymerised and moulded in the same manner as before. Alternatively, however, the vessel may be removed, by releasing the bolts 69 which secure the vessel to the top of the frame 15 and by releasing the nuts 26, and a fresh vessel, in which the polymerisation has already taken place, may be substituted for it so that moulding can proceed immediately.

Having described my invention, what I desire to secure by Letters Patent is:

1. Apparatus for forming fusible filament-forming polymers into solid pieces of uniform size and shape, said apparatus comprising an autoclave, heating means for said autoclave, an outlet valve leading from the bottom of said autoclave for the passage of molten polymer from said autoclave, a perforated rotatable block having its axis fixed in relation to said autoclave and adapted in its rotation to bring the perforations therein successively into register with said outlet valve, means for supplying fluid under pressure into said autoclave so as to fill said perforations in succession with molten polymer under the pressure of said fluid, two closure plates, one in contact with each face of said block so as to close at each end the perforations extending through said block, means for supplying cooling fluid to the closure plate remote from said outlet valve, said fluid being supplied locally to a point on said plate opposite to said outlet valve, a plunger spaced from said outlet valve, and means for driving said plunger in and out of successive perforations in said block in timed relation with the rotation of said block for ejecting solidified polymer from each of said perforations in turn.

2. Apparatus for forming fusible filament-forming polymers into solid pieces of uniform size and shape, said apparatus comprising an autoclave, heating means for said autoclave, an outlet valve leading from the bottom of said autoclave for the passage of molten polymer from said autoclave, a perforated rotatable block having its axis fixed in relation to said autoclave and adapted in its rotation to bring the perforations therein successively into register with said outlet valve, two closure plates, one in contact with each face of said block so as to close at each end the perforations extending through said block, means for supplying cooling fluid to the closure plate remote from said outlet valve, said fluid being supplied locally to a point on said plate opposite to said outlet valve, and means for supplying fluid under pressure into said autoclave so as to fill said perforations in succession with molten polymer under the pressure of said fluid.

3. Apparatus for forming fusible filament-forming polymers into solid pieces of uniform size and shape, said apparatus comprising an autoclave, heating means for said autoclave, an outlet valve leading from the bottom of said autoclave for the passage of molten polymer from said autoclave, a perforated rotatable block having its axis fixed in relation to said autoclave and adapted in its rotation to bring the perforations therein successively into register with said outlet valve, two closure plates, one in contact with each face of said block so as to close at each end the perforations extending through said block, means for supplying cooling fluid to the closure plate remote from said outlet valve, said fluid being supplied locally to a point on said plate opposite to said outlet valve, said plate being formed with a groove extending from the cooled point on the face of said plate adjacent to said rotatable block to serve as a passage for the escape of gas from the perforation that is in register with said outlet valve, and means for supplying fluid under pressure into said autoclave so as to fill said perforations in succession with molten polymer under the pressure of said fluid.

4. Apparatus for forming fusible filament-forming polymers into solid pieces of uniform size and shape, said apparatus comprising an autoclave, heating means for said autoclave, an outlet valve leading from the bottom of said autoclave for the passage of molten polymer from said autoclave, a perforated rotatable block having its axis fixed in relation to said autoclave and adapted in its rotation to bring the perforations therein successively into register with said outlet valve, two closure plates, one in contact with each face of said block so as to close at each end the perforations extending through said block, means for supplying cooling fluid to the closure plate remote from said outlet valve, said fluid being supplied locally to a point on said plate opposite to said outlet valve, said plate being formed with a groove extending from the cooled point on the face of said plate adjacent to said rotatable block to serve as a passage for the escape of gas from the perforation that is in register with said outlet valve, means for supplying fluid under pressure into said autoclave so as to fill said perforations in succession with molten polymer under the pressure of said fluid, a plunger spaced from said outlet valve, and means for driving said plunger in and out of successive perforations in said block in timed relation with the rotation of said block for ejecting solidified polymer from each of said perforations in turn.

WILLIAM POOL.

REFERENCES CITED

The following references are of record in the file of this patent:

UNITED STATES PATENTS

| Number | Name | Date |
| --- | --- | --- |
| 452,599 | Dooley | May 19, 1891 |
| 2,077,542 | Wulff et al. | Apr. 20, 1937 |
| 2,121,966 | Jacobson | June 28, 1938 |
| 2,217,335 | Eden | Oct. 8, 1940 |
| 2,282,308 | Dahlin | May 12, 1942 |
| 2,375,955 | Smith | May 15, 1945 |